United States Patent [19]

Hoch et al.

[11] 3,968,853

[45] July 13, 1976

[54] NOTCH ATTENUATION DEVICE

[75] Inventors: René Gérard Hoch, La Rochette; Michel Henri Julliand, Melun, both of France

[73] Assignee: Societe Nationale d'Etude et de Construction de Moteurs d'Aviation, Paris, France

[22] Filed: Aug. 30, 1974

[21] Appl. No.: 502,198

[30] Foreign Application Priority Data

Aug. 31, 1973 France .............................. 73.31582

[52] U.S. Cl. ........................ 181/33 C; 181/33 HB; 244/1 N
[51] Int. Cl.² ...................................... B64D 33/06
[58] Field of Search ......... 181/33 HB, 33 B, 33 HC, 181/33 C, 33 HD, 33 D, 33 E, 33 L; 239/265.11, 265.13, 265.19, 265.27, 265.31, 265.33, 265.35, 265.37, 265.39; 244/1 N, 54, 55

[56] References Cited

UNITED STATES PATENTS

| | | | |
|---|---|---|---|
| 3,033,494 | 5/1962 | Tyler et al. ............... | 181/33 HB UX |
| 3,174,282 | 3/1965 | Harrison ..................... | 244/1 N UX |
| 3,706,353 | 12/1972 | Ffowces-Williams et al. . | 181/33 HC |
| 3,743,185 | 7/1973 | Ffowces-Williams et al. ..................... 181/33 HC UX | |

FOREIGN PATENTS OR APPLICATIONS 886,201    1/1962    United Kingdom ............ 181/33 HC

*Primary Examiner*—John Gonzales
*Attorney, Agent, or Firm*—William J. Daniel

[57] ABSTRACT

A method for the attenuation of the noise emitted by a main exhaust nozzle of a jet engine, wherein an auxiliary exhaust nozzle adapted to emit less noise than the main nozzle is associated with said main nozzle and is located to the side of the main nozzle, in the direction in which it is desired to attenuate the noise of the main nozzle.

5 Claims, 5 Drawing Figures

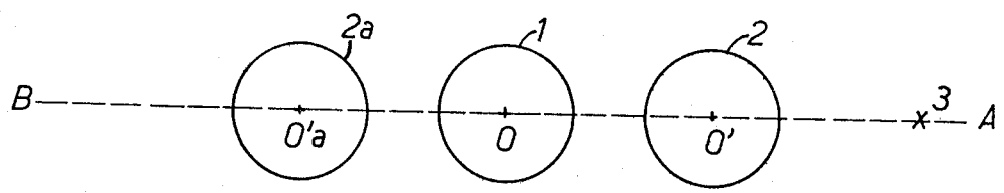
FIG.:1
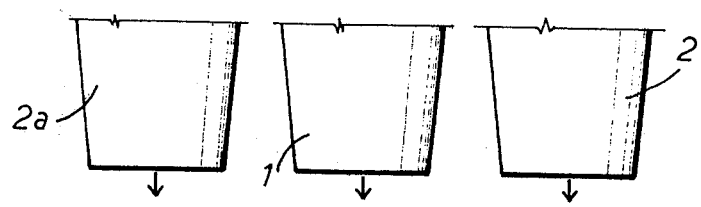
FIG.:2
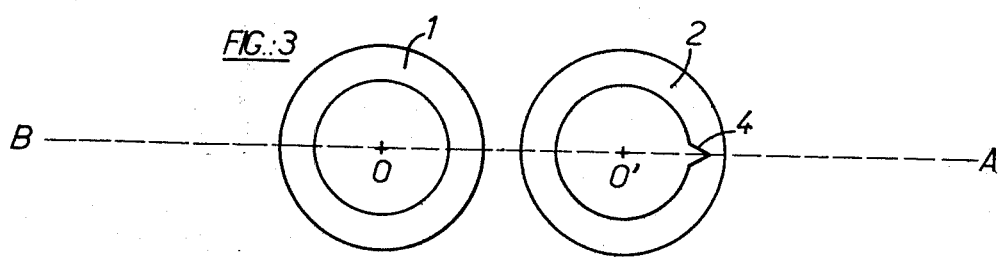
FIG.:3
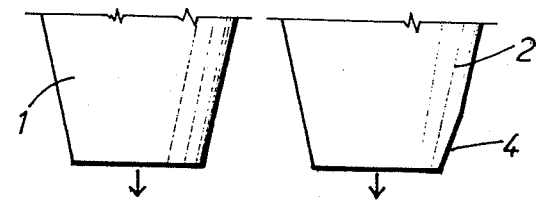
FIG.:4

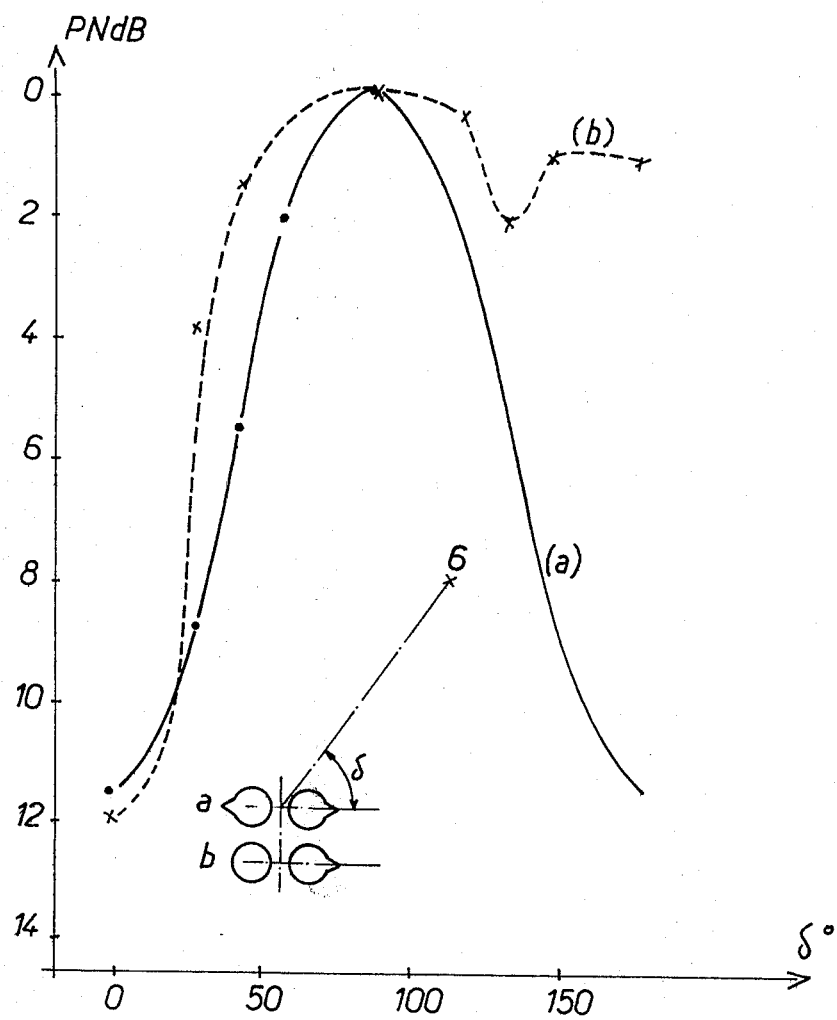
FIG.: 5

NOTCH ATTENUATION DEVICE

BACKGROUND OF THE INVENTION

Various proposals have been made for reducing the noise produced by an exhaust nozzle of a jet propulsion engine, and such proposals have related to the design of the exhaust nozzle itself.

The present invention relates to an effect external to the exhaust nozzle the noise of which it is desired to reduce, which effect is a kind of acoustic mask effect.

SUMMARY OF THE INVENTION

The invention is characterised in that in each direction in which it is intended to attenuate the noise of a main exhaust nozzle, an auxiliary exhaust nozzle, less noisy than the main nozzle is interposed between said main nozzle and a listener situated in that direction. It has been observed that under these conditions and provided that there is not too great a difference between the noise levels of the two exhaust nozzles, the listener hears only the noise of the less noisy auxiliary nozzle.

BRIEF DESCRIPTION OF THE DRAWINGS

The invention will now be further described, by way of example, with reference, to the accompanying drawings, in which:

FIG. 1 is a diagrammatic view in projection on to a vertical plane perpendicular to the axes of the grouped exhaust nozzle and showing the outlet edges of these nozzles, FIG. 2 is a corresponding view in horizontal projection, FIG. 3 illustrates a form of embodiment of the invention in a representation analogous with that of FIG. 1, FIG. 4 is a corresponding view in horizontal projection, FIG. 5 is a graph illustrating the result obtained.

DESCRIPTION OF PREFERRED EMBODIMENTS

In FIG. 1 there is seen the endless outlet edge 1 of a main exhaust nozzle 1 of a jet propulsion engine, giving a jet which is perpendicular to the plane of the drawing and is directed for example from the back towards the front of this plane.

This main exhaust nozzle 1 may be a normal exhaust nozzle without silencer, consequently giving the full realisable thrust without the loss of thrust generally involved by a silencer, and thus has an intense sound emission, mainly on take-off.

In order to attenuate the noise which this main exhaust nozzle 1 emits in the transversal horizontal direction OA for example, with the said main nozzle there is juxtaposed an auxiliary exhaust nozzle 2 having the centre O' situated along OA between O and A, which can belong to another engine of the aircraft and is designed or arranged in such manner that its acoustic emission towards A is less than the emission of the main exhaust nozzle.

It has been observed that under these conditions an observer situated along OA, for example at 3, perceives substantially only the noise of the auxiliary nozzle 2, that of the main nozzle 1 being masked. In tests carried out by the Applicants a practically complete mask effect was obtained for noise level differences of 1 and 2 emitted in the direction OA of the order of 15 PNdB.

If it is desired to mask the noise in the opposite transversal horizontal direction OB, one can likewise associate with the main nozzle 1 a second auxiliary nozzle 2a similar to the first auxiliary nozzle 2 and having its centre $O'a$ on OB, the two auxiliary nozzles 2 and 2a thus permitting the reduction of the noise for populations residing on either side of a flight path.

To attenuate the noise in the overflown zones, one can also interpose a less noisy third auxiliary nozzle 2b beneath the noisy main exhaust nozzles 1, i.e. in a vertical downward direction. As will be seen, each auxiliary nozzle 2, 2a, 2b has an outlet edge located out of contact with the endless outlet edge of the main exhaust nozzle 1 and offset with respect thereto in the respective transversal direction.

The auxiliary nozzles such as 2, 2a, 2b can be silenced exhaust nozzles of a type already existing in different models, or exhaust nozzles of which the terminal convergent part is equipped with one or two notches 4 permitting a local expansion of the gases. These notches can be formed in such manner as to interrupt the outlet edge of the auxiliary nozzles, as shown in FIGS. 3 and 4 and as described especially in the co-pending U.S. patent application filed today by the present Applicants for "Apparatus for the Attenuation of Noise emitted by the Jet Propulsion Pipes of Jet Engines". These exhaust nozzles are oriented in such manner that a notch 4 is in the plane OA where it is intended to mask the noise of the main exhaust nozzle 1.

As is known, such notched exhaust nozzles have the effect of spreading the jet in the plane containing the axis of the exhaust nozzle and that of the notch and of attenuating the noise in this plane and in the vicinity thereof. However other types of exhaust nozzles exist which give an effect of spreading of the jet, for example those comprising opposed panels which can be oriented so that they come to constrict the jet, spreading it in a plane intermediate between the panels. Such jet pipes have been described especially in the U.S. Pat. No. 3,820,626 filed by the Applicants and in the patent application filed today for "A Device for the Attenuation of Noise Emission by the Jet Pipes of Jet Engines". A nozzle of this kind can be utilised as masking auxiliary nozzle within the scope of the present invention, the plane of spread being orientated in the direction in which it is desired to attenuate the noise.

The graph in FIG. 5 demonstrates the result obtained in accordance with the invention.

To trace this graph, a listening microphone 6 was placed in the vertical plane containing the outlet edges of two coupled exhaust nozzles, which outlet edges are represented on a very small scale at $a$ and $b$ for two different cases, towards the bottom of FIG. 5, between the curves and the abscissae axis.

In the case $a$ the two grouped exhaust nozzles have their final convergent parts equipped with a single notch interrupting their outlet edge, as described in the already mentioned patent application filed today, and the exhaust nozzles are orientated in such manner that the axes of the notches, placed at the exterior, are in the plane containing the axes of the two jet pipes.

As has been recalled, such exhaust nozzles have a clearly reduced sound emission on the side of the notch, in the plane passing through the axis of the exhaust nozzle and the axis of the notch.

The two exhaust nozzle functioned wth a ratio of pressures equal to 3 and an absolute gas temperature equal to 1100° K.

Various measurements are carried out, the microphone being displaced in the above-mentioned vertical plane over a circle centred on the axis of symmetry of the exhaust nozzles.

The angle δ characterising the direction of the microphone was placed as abscissae for each measurement and the noise in PNdB perceived for each direction was placed as ordinates, taking as zero the noise corresponding to two equivalent convergent exhaust nozzles without any notch or silencer.

Under these conditions the curve traced in solid lines in FIG. 5 was obtained. As may be seen, this curve passes through a minimum for δ = 0, which corresponds to the attenuation of the noise in the plane of a notch, then through a maximum, which should be reached for δ = 90°, and passes again through a minimum for δ = 180° (plane of the notch of the exhaust nozzle on the left in sketch $a$).

Similar measurements were made again after the notched exhaust nozzle on the left of the sketch $a$ had been replaced by an equivalent convergent exhaust nozzle but without notch or silencer of and kind (sketch $b$).

Then the curve traced in chain lines was obtained.

As is seen, for δ = 0 the curve starts from a minimum which practically coincides with that of the previous case, which means that it is only the noise of the notched exhaust nozzle which is perceived, the noise of the unnotched and unsilenced exhaust nozzle being masked.

The curve then passes again through the same maximum as previously for δ = 90°, and then is subjected to slight fluctuations which do not depart much from this maximum until δ = 180°.

It is moreover self evident that the forms of embodiment as described have been given only by way of examples and that they could be modified, especially by the substitution of technical equivalents, without thereby departing from the scope of the invention.

We claim:

1. In a jet propulsion system comprising a main unsilenced exhaust nozzle having an endless outlet edge, a method for masking, in a given transversal direction with respect to said main nozzle, the noise emitted by said main nozzle, said masking method comprising the step of arranging in spaced offset relation to said main nozzle in said given transversal direction, an auxiliary exhaust nozzle less noisy than said main unsilenced exhaust nozzle in said given transversal direction and having an outlet edge located out of contact with the endless outlet edge of said main nozzle and interrupted by a single notch facing said given transversal direction.

2. In a jet propulsion system comprising a main unsilenced exhaust nozzle having an endless outlet edge, a method for masking in a first substantially horizontal direction and in a second substantially horizontal direction opposite to said first direction, the noise emitted by said main nozzle, said masking method comprising the step of respectively arranging in spaced relation to said main nozzle in said first horizontal direction and in said second horizontal direction, a first auxiliary exhaust nozzle which is less noisy than said main unsilenced exhaust nozzle is said first horizontal direction and a second auxiliary exhaust nozzle which is less noisy than said main unsilenced exhaust nozzle in said second horizontal direction, each of said auxiliary nozzles having an outlet edge located out of contact with the endless outlet edge of said main nozzle and offset with respect thereto in the respective horizontal direction.

3. A masking method as claimed in claim 2, wherein the outlet edge of each said interposed auxiliary nozzle is interrupted by a single notch respectively facing said first and said second horizontal directions.

4. In a jet propulsion system comprising a main unsilenced exhaust nozzle having an endless outlet edge, a method for masking in a first substantially horizontal direction, in a second substantially horizontal direction opposite to said first direction, and in a third vertical downward direction, the noise emitted by said main nozzle, said masking method comprising the step of respectively arranging in spaced relation to said main nozzle in said first horizontal direction, in said second horizontal direction and in said third vertical direction, a first auxiliary exhaust nozzle which is less noisy than said main unsilenced exhaust nozzle in said first horizontal direction, a second auxiliary exhaust nozzle which is less noisy than said main unsilenced exhaust nozzle in said second horizontal direction; and a third auxiliary exhaust nozzle which is less noisy than said main unsilenced exhaust nozzle in said third vertical downward direction, each of said auxiliary nozzles having an outlet edge located out of contact with the endless outlet edge of said main nozzle and offset with respect thereto in the respective transversal direction.

5. A masking device as claimed in claim 4, wherein the outlet edge of each said interposed auxiliary nozzle is interrupted by a single notch respectively facing said first, said second and said third directions.

* * * * *